UNITED STATES PATENT OFFICE.

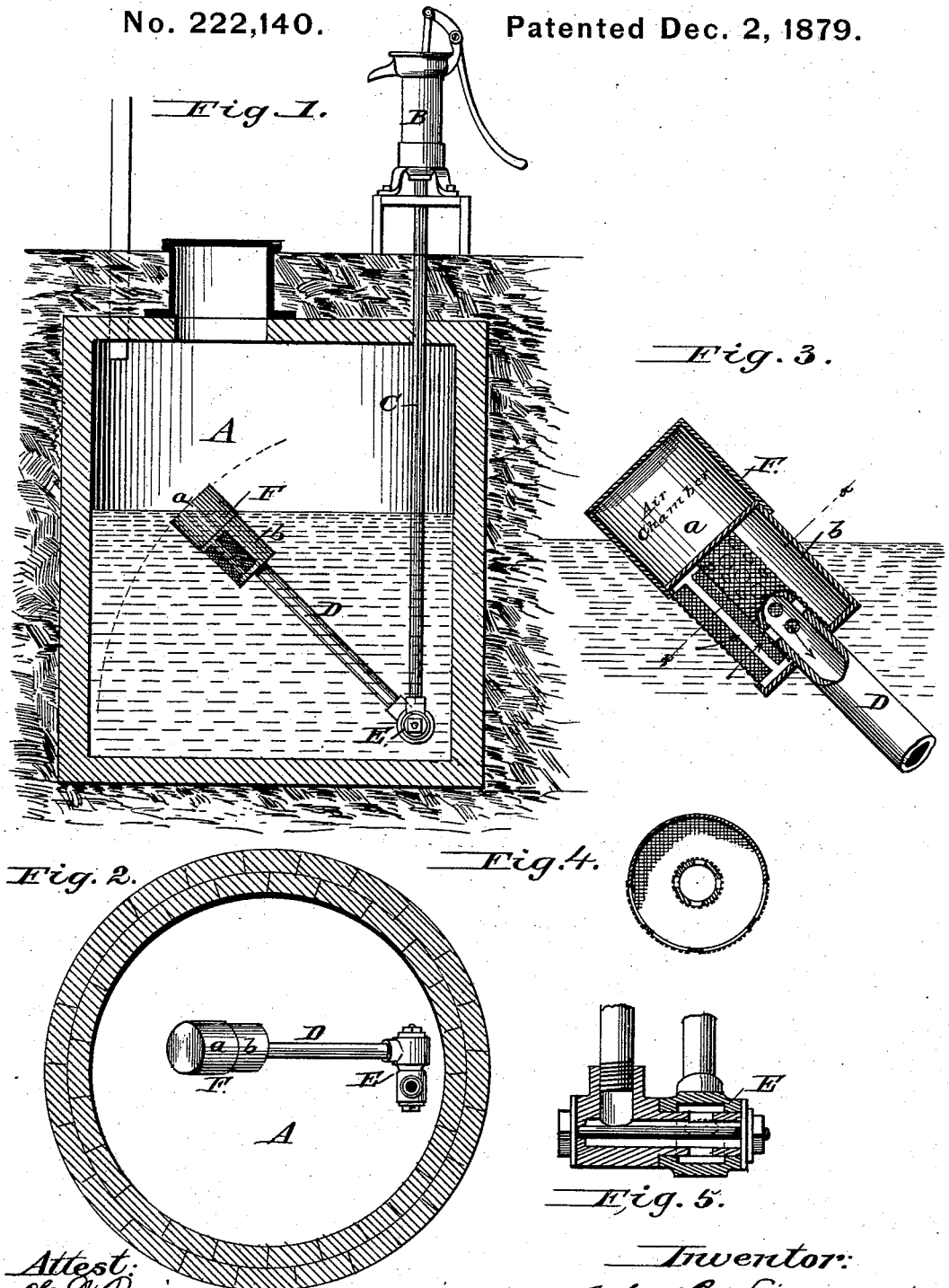

JOHN B. LINDSAY, OF DAVENPORT, IOWA.

IMPROVEMENT IN WATER DRAWING AND FILTERING APPARATUS FOR CISTERNS AND OTHER VESSELS.

Specification forming part of Letters Patent No. 222,140, dated December 2, 1879; application filed October 17, 1879.

*To all whom it may concern:*

Be it known that I, JOHN B. LINDSAY, of Davenport, in the county of Scott and State of Iowa, have invented certain new and useful Improvements in Water Drawing and Filtering Apparatus for Cisterns and other Vessels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide means for withdrawing water from cisterns used in connection with dwellings, so as to secure the water free from surface-floatings and from sediment.

To this end the invention consists in the combination of a pump and a suction-pipe with a hinged receiving-pipe, provided with a floating filter, adapted to take the water from below, but near, the surface of the water; and the invention further consists in the peculiar construction of said floating filter, all as hereinafter more specifically described and distinctly claimed.

In the drawings, Figure 1 represents a section of a cistern, showing this invention applied thereto. Fig. 2 is a transverse section of same. Fig. 3 is a longitudinal section of the floating filter. Fig. 4 is transverse section of same on line $x$ $x$ of Fig. 3. Fig. 5 is a section of the hinge-coupling uniting the suction and filtering pipes.

The cistern A is the ordinary underground structure used as a water-reservoir for dwellings, built in convenient proximity to or directly beneath the house.

The pump B may be located at any convenient point within the house or yard.

A pipe, C, connects the pump with the receiving-pipe D. This connecting-pipe C enters at or near the top and descends to the bottom of the cistern or tank, and is there connected to the pipe D by means of a flexible or swing-joint coupling, E.

The receiving-pipe D is provided at its outer end with a floating filter, F, by which it is caused to swing in conformity with the rise and fall of the water.

The filter F consists of a hollow cylinder of a diameter considerably larger than the diameter of the receiving-pipe, surrounding and inclosing the end of said receiving-pipe. This cylinder is divided centrally of its length into two compartments or chambers, $a$ $b$, the chamber $a$ being filled with air to serve as a buoy, and the chamber $b$ being filled with charcoal or some other light filtering material. The pipe D extends axially through the filtering-chamber $b$, and that portion of said pipe inclosed in said chamber is perforated all around its circumference to admit the water. This inclosed perforated portion of the pipe is jacketed with fine wire-gauze to prevent the entrance of filtering material into the pipe, and the clogging of the perforations. The outer shell of the filter is provided with rectangular openings in its under side to admit the water from the cistern to the filter, which openings are also covered with fine wire-gauze.

As thus constructed the filtering-chamber is of annular form, and holds a large amount of filtering material; and the water, entering the filter through the gauze-covered openings in the under side, distributes itself throughout the mass thereof, since the end of the receiving-pipe surrounded thereby is perforated around its entire circumference.

The pipe D may have a union-joint just below the filter, so that the latter may be taken off and put on readily.

This apparatus is adapted to various forms of cisterns, tanks, or vessels for the pumping and filtering of liquids.

What is claimed as the invention is—

1. The combination of an underground cistern, a suction-pipe extending into and to the bottom of the cistern, a swinging receiving-pipe connected to said suction-pipe by means of a hinge-coupling, a floating filter attached to the end of said receiving-pipe, and a pump placed above or beyond the cistern, all substantially as described.

2. A floating filter consisting of a pipe perforated around its circumference and a hollow cylinder of larger diameter surrounding the pipe, said perforated pipe being jacketed with wire-gauze, and said cylinder being divided transversely into two compartments, forming an air-chamber at its upper end and a filtering-chamber at its lower end, the under side of the latter being provided with gauze-covered openings, substantially as described.

In testimony that I claim the foregoing I have hereunto set my hand this 14th day of October, 1879.

JOHN B. LINDSAY.

Witnesses:
D. B. SHELLEY.
ERASTUS A. BENSON,
WM. H. RYER.